UNITED STATES PATENT OFFICE.

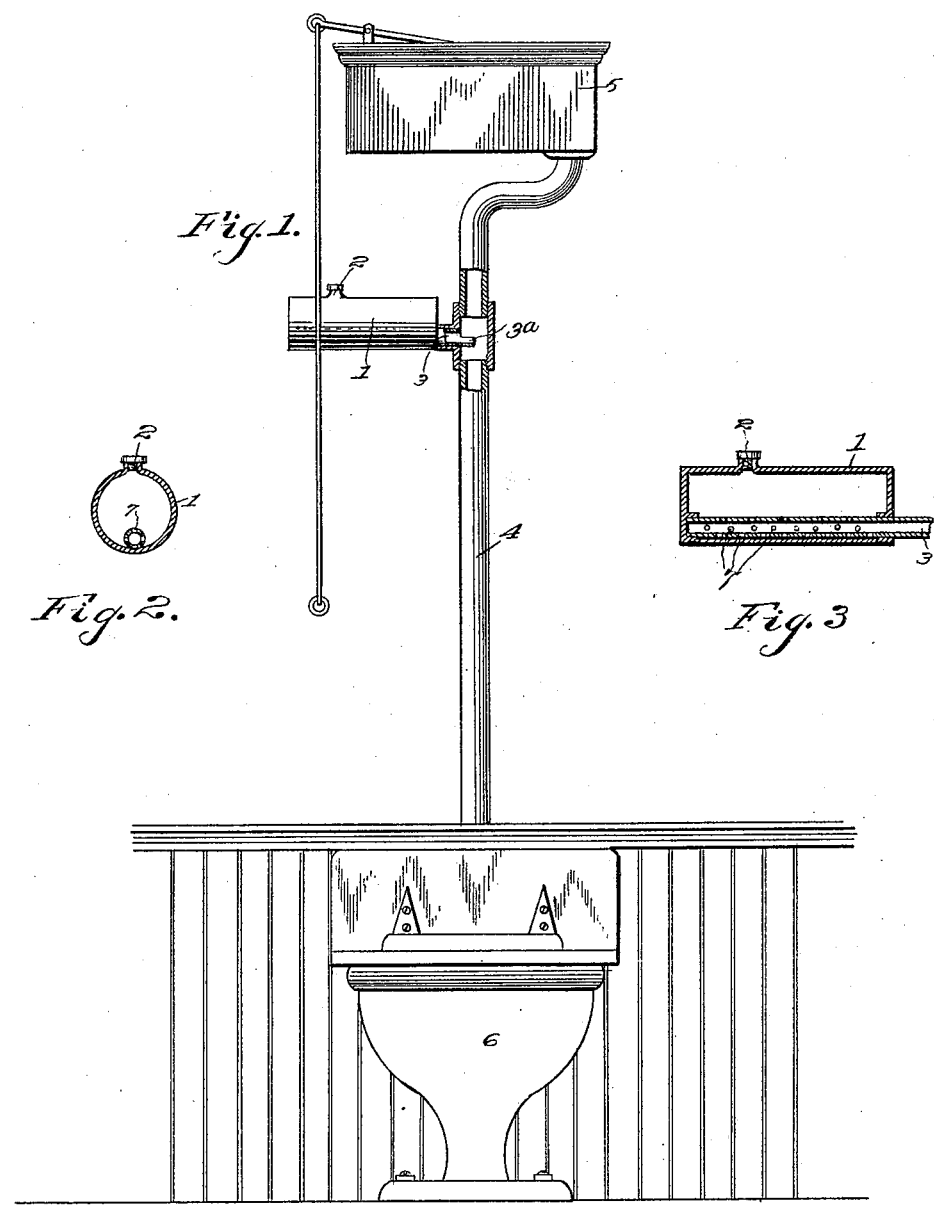

ISAIAH W. WILLITS, OF BLOOMSBURG, PENNSYLVANIA.

DISINFECTING APPARATUS.

SPECIFICATION forming part of Letters Patent No. 690,337, dated December 31, 1901.

Application filed March 15, 1901. Serial No. 51,349. (No model.)

*To all whom it may concern:*

Be it known that I, ISAIAH W. WILLITS, a citizen of the United States, residing at Bloomsburg, in the county of Columbia and State of Pennsylvania, have invented a new and useful Disinfecting Apparatus, of which the following is a specification.

The invention relates to a disinfecting apparatus for water-closets.

The object of the present invention is to improve the construction of devices for disinfecting water-closets and to provide a simple, inexpensive, and efficient one adapted to be readily applied to the pipe or conduit which connects the flushing-tank with the bowl of the water-closet and capable when the bowl is flushed of receiving a portion of the water from the flushing-tank and of saturating the same with a disinfectant and of allowing such water to drain back to the said pipe or conduit and flow downward to the bowl.

The invention consists in the construction and novel combination and arrangement of parts hereinafter fully described, illustrated in the accompanying drawings, and pointed out in the claim hereto appended.

In the drawings, Figure 1 is an elevation of a disinfecting apparatus constructed in accordance with this invention and shown applied to the pipe or conduit for connecting the flushing-tank with the bowl of a water-closet. Fig. 2 is a transverse sectional view of the disinfecting apparatus. Fig. 3 is a longitudinal sectional view of the same.

Like numerals of reference designate corresponding parts in all the figures of the drawings.

1 designates a cylindrical shell or casing designed to contain a suitable disinfectant and provided at its top with a suitable filling-opening 2 and connected by a short horizontal tube 3 with the pipe or conduit 4, which extends from the flushing-tank 5 to the bowl 6 of a water-closet, as clearly illustrated in Fig. 1 of the accompanying drawings. The cylindrical shell is disposed horizontally at one side of the pipe or conduit 4, and it may be supported in such position by any suitable means, such as a bracket or the like, and the short tube, which may be connected with the pipe or conduit 4 by any suitable joint, preferably extends the entire length of the casing or shell. The casing or shell is provided at its inner end with an opening through which the short tube extends, and the said short tube is provided within the shell or casing with suitable perforations 7, communicating with the interior of the shell or casing and permitting a portion of the water from the flushing-tank to flow into the shell or casing and become saturated with the disinfectant contained therein. When the bowl of the water-closet is flushed, a portion of the water from the flushing-tank enters the shell or casing through the short tube, and after the bowl has been flushed the water contained within the shell or casing has become saturated with the disinfectant and drains back through the short tube to the pipe or conduit 4 and flows down to the bowl and disinfects the same. The short tube is arranged at the bottom of the shell or casing to enable the water within the same to drain completely therefrom, and by supplying the bowl with the disinfectant after the operation of flushing has been completed the said disinfectant will remain in the bowl until the next flushing operation, thereby constantly maintaining the bowl in a complete sanitary condition.

In order to cause a positive flow of water through the short tube to the casing, the said short tube is provided within the pipe or conduit 4 with a bottom lip or projection $3^a$, arranged in the path of the water and adapted to receive a portion of the same. The extension $3^a$ projects inward from one side of the pipe or conduit 4, and it terminates short of the opposite side and does not interfere with the return of the water of the casing to the pipe or conduit 4.

It will be seen that the disinfecting apparatus is exceedingly simple and inexpensive in construction, that it is adapted to be readily applied to the pipe or conduit extending from the flushing-tank to the bowl of a water-closet, and that it is capable of saturating a quantity of water with a disinfectant and of causing the same to flow into the bowl after the flushing of the latter has been effected. It will also be apparent that the bowl is constantly maintained in a sanitary condition and that the greatest effects of a disinfectant are obtained.

What I claim is—

The combination with a pipe or conduit of a flushing-tank, of a horizontal shell or casing arranged at one side of the pipe or conduit and designed to contain a disinfectant and provided at its top with a filling-opening, and the short horizontal tube arranged at the bottom of the shell or casing and having a perforated inner portion, the outer portion being extended through one of the walls of the pipe or conduit and provided with a projecting lip arranged at the bottom of the tube and adapted to direct a portion of the water from the tank into the tube, said tube being also arranged to permit such water to drain back through it and flow into the pipe or conduit, substantially as described.

In testimony that I claim the foregoing as my own I have hereto affixed my signature in the presence of two witnesses.

ISAIAH W. WILLITS.

Witnesses:
M. E. Cox,
R. R. Zarr.